US012142019B2

(12) United States Patent
Tsuji et al.

(10) Patent No.: US 12,142,019 B2
(45) Date of Patent: Nov. 12, 2024

(54) APPARATUS, METHOD, AND STORAGE MEDIUM TO DETECT SECOND AREA BASED ON PREVIOUS DETECTION INFORMATION WHEN FIRST AREA OF OBJECT BECOMES NOT DETECTABLE

(71) Applicant: CANON KABUSHIKI KAISHA, Tokyo (JP)

(72) Inventors: Ryosuke Tsuji, Kanagawa (JP); Kanako Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/676,003

(22) Filed: Feb. 18, 2022

(65) Prior Publication Data
US 2022/0277537 A1 Sep. 1, 2022

(30) Foreign Application Priority Data
Feb. 26, 2021 (JP) ................. 2021-030470

(51) Int. Cl.
*G06V 10/22* (2022.01)
*G06T 7/11* (2017.01)
(Continued)

(52) U.S. Cl.
CPC ............. *G06V 10/22* (2022.01); *G06T 7/11* (2017.01); *G06T 7/20* (2013.01); *G06T 7/60* (2013.01);
(Continued)

(58) Field of Classification Search
CPC ...... G06V 10/22; G06V 10/774; G06V 40/10; G06T 7/11; G06T 2207/20081;
(Continued)

(56) References Cited

U.S. PATENT DOCUMENTS 9,137,448 B2 * 9/2015 Uemura ................. H04N 23/62
9,426,364 B2 * 8/2016 Hashimoto ............. G06T 7/593
(Continued)

FOREIGN PATENT DOCUMENTS

CN 107315095 A * 11/2017 ................ G01P 3/38
JP 2012195812 A * 10/2012
(Continued)

OTHER PUBLICATIONS

Yongxi Lu, Tara Javidi, and Svetlana Lazebnik. Adaptive object detection using adjacency and zoom prediction. In Proceedings of the IEEE Conference on Computer Vision and Pattern Recognition, pp. 2351-2359, 2016. (Year: 2016).*

*Primary Examiner* — Michael Robert Cammarata
(74) *Attorney, Agent, or Firm* — Canon U.S.A., Inc. IP Division

(57) ABSTRACT

An apparatus includes an acquisition unit configured to acquire captured data, a first detection unit configured to detect a first area of an object from the data, a second detection unit configured to detect a second area of the object from the data, and an output unit configured to output a result of detection by the first detection unit and a result of detection by the second detection unit, wherein, in a case where the first detection unit detects the first area in first data, the second detection unit detects the second area in an area corresponding to the first area.

18 Claims, 9 Drawing Sheets

(51) Int. Cl.
   *G06T 7/20* (2017.01)
   *G06T 7/60* (2017.01)
   *G06T 7/70* (2017.01)
   *G06V 10/74* (2022.01)
   *G06V 10/774* (2022.01)
   *G06V 20/60* (2022.01)
   *G06V 40/10* (2022.01)
   *H04N 23/667* (2023.01)

(52) U.S. Cl.
   CPC ............... *G06T 7/70* (2017.01); *G06V 10/74* (2022.01); *G06V 10/7747* (2022.01); *G06V 20/60* (2022.01); *G06V 40/10* (2022.01); *H04N 23/667* (2023.01); *G06T 2207/20081* (2013.01); *G06T 2207/20132* (2013.01); *G06T 2207/30196* (2013.01)

(58) Field of Classification Search
   CPC .......... G06T 2207/20104; G06T 2207/20132; H04N 23/69; H04N 23/695; H04N 23/698
   See application file for complete search history.

(56) References Cited

U.S. PATENT DOCUMENTS

| | | | |
|---|---|---|---|
| 10,540,572 B1 * | 1/2020 | Kim | G06T 5/50 |
| 11,423,265 B1 * | 8/2022 | Chen | G06T 11/00 |
| 11,431,893 B2 * | 8/2022 | Okamoto | H04N 23/675 |
| 2009/0060352 A1 * | 3/2009 | Distante | G06V 10/52 |
| | | | 382/224 |
| 2011/0091116 A1 * | 4/2011 | Yano | G06V 10/443 |
| | | | 382/209 |
| 2014/0341430 A1 * | 11/2014 | Ryu | G06T 3/40 |
| | | | 382/103 |
| 2016/0021315 A1 * | 1/2016 | Tsubusaki | H04N 23/611 |
| | | | 348/240.1 |
| 2016/0021316 A1 * | 1/2016 | Tsubusaki | H04N 23/69 |
| | | | 348/240.1 |
| 2017/0094184 A1 * | 3/2017 | Gao | G06T 7/337 |
| 2017/0104938 A1 * | 4/2017 | Shimosato | H04N 23/61 |
| 2017/0169567 A1 * | 6/2017 | Chefd'hotel | G06T 7/0012 |
| 2017/0262998 A1 * | 9/2017 | Zhao | G06V 10/7788 |
| 2018/0373943 A1 * | 12/2018 | Tanigawa | G06V 10/25 |
| 2019/0087673 A1 * | 3/2019 | Li | G08G 1/09623 |
| 2019/0156202 A1 * | 5/2019 | Falk | G06N 3/08 |
| 2020/0388060 A1 * | 12/2020 | Rimon | G06T 7/70 |
| 2021/0104047 A1 * | 4/2021 | Kamo | G06V 10/75 |
| 2021/0256306 A1 * | 8/2021 | Kashu | G06V 10/25 |
| 2023/0087292 A1 * | 3/2023 | Wang | G06V 20/70 |
| 2023/0091062 A1 * | 3/2023 | Challa | G06F 18/24133 |
| | | | 382/104 |

FOREIGN PATENT DOCUMENTS

| | | | | |
|---|---|---|---|---|
| JP | 2016206352 A | | 12/2016 | |
| JP | 2017167438 A | * | 9/2017 | ............. G01S 3/00 |
| JP | 2020197795 A | | 12/2020 | |
| WO | 2020137602 A | | 7/2020 | |
| WO | WO-2022091577 A1 | * | 5/2022 | ............. G06V 40/00 |

* cited by examiner

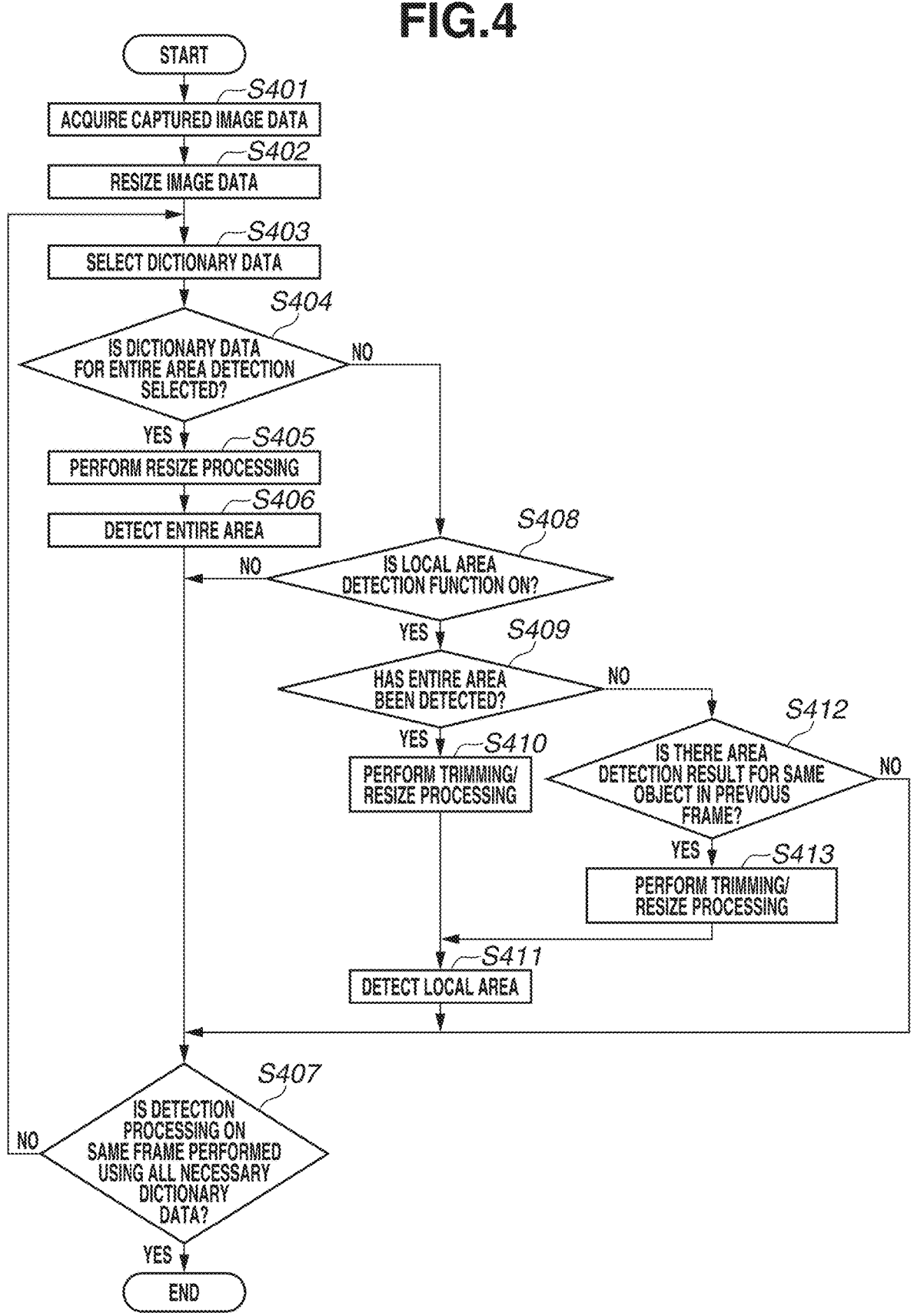

FIG.8A
DETECTED OBJECT: NONE
PREFERENTIALLY DETECTED OBJECT SETTING: VEHICLE

V0 → [PERSON'S HEAD | VEHICLE 1 (MOTORCYCLE) | VEHICLE 2 (AUTOMOBILE)]
V1 → [PERSON'S HEAD | VEHICLE 1 (MOTORCYCLE) | VEHICLE 2 (AUTOMOBILE)]

FIG.8B
DETECTED OBJECT: VEHICLE 1 (MOTORCYCLE)
PREFERENTIALLY DETECTED OBJECT SETTING: VEHICLE

V0 → [VEHICLE 1 (MOTORCYCLE) | PERSON'S HEAD | VEHICLE 1 (LOCAL AREA OF MOTORCYCLE)]
V1 → [VEHICLE 1 (MOTORCYCLE) | PERSON'S HEAD | VEHICLE 1 (LOCAL AREA OF MOTORCYCLE)]

FIG.8C
DETECTED OBJECT: PERSON'S HEAD
PREFERENTIALLY DETECTED OBJECT SETTING: VEHICLE

V0 → [PERSON'S HEAD | VEHICLE 1 (MOTORCYCLE) | PERSON'S PUPILS]
V1 → [PERSON'S HEAD | VEHICLE 1 (MOTORCYCLE) | PERSON'S PUPILS]

FIG.8D
DETECTED OBJECT: NONE
PREFERENTIALLY DETECTED OBJECT SETTING: NONE

V0 → [PERSON'S HEAD | ANIMAL 1 (DOG AND CAT) | ANIMAL 2 (BIRD)]
V1 → [PERSON'S HEAD | VEHICLE 1 (MOTORCYCLE) | VEHICLE 2 (MOTORCYCLE)]

FIG.8E
DETECTED OBJECT: VEHICLE 1 (MOTORCYCLE)
PREFERENTIALLY DETECTED OBJECT SETTING: VEHICLE

V0 → [VEHICLE 1 (MOTORCYCLE)]
V1 → [VEHICLE 1 (MOTORCYCLE)]

APPARATUS, METHOD, AND STORAGE MEDIUM TO DETECT SECOND AREA BASED ON PREVIOUS DETECTION INFORMATION WHEN FIRST AREA OF OBJECT BECOMES NOT DETECTABLE

BACKGROUND

Field of the Disclosure

The aspect of the embodiments relates to an apparatus, an image apparatus, a method for apparatus, and a storage medium.

Description of the Related Art

There is a technique for performing image processing to detect an object based on a trained model obtained by performing machine learning to detect a specific object from image data captured by an image apparatus such as a digital camera.

Japanese Patent Application Laid-Open No. 2020-197795 discusses a technique for automatically detecting a specific area of an object and further detecting a narrower area included in the specific area from the specific area, thereby making it possible to detect a local area of the specific object. However, in a case where the entire area of the specific object cannot be detected, it is difficult to detect the local area.

SUMMARY OF THE DISCLOSURE

According to an aspect of the embodiments, an apparatus includes at least one processor and a memory coupled to the at least one processor storing instructions that, when executed by the processor, cause the processor to function as an acquisition unit configured to acquire captured data, a first detection unit configured to detect a first area of an object from the data; a second detection unit configured to detect a second area of the object from the data, and an output unit configured to output a result of detection by the first detection unit and a result of detection by the second detection unit, wherein, in a case where the first detection unit detects the first area in first data, the second detection unit detects the second area in an area corresponding to the first area, and wherein, in a case where the first area is detected in the first data and the first area is not detected in second data captured after the first data, the second detection unit detects the second area in an area wider than the first area detected in the first data.

Further features of the disclosure will become apparent from the following description of exemplary embodiments with reference to the attached drawings.

BRIEF DESCRIPTION OF THE DRAWINGS

FIG. 4 is a flowchart illustrating a processing procedure according to an exemplary embodiment.

FIGS. 8A to 8E each illustrate an example of a sequence for switching among a plurality of pieces of dictionary data in one frame.

DESCRIPTION OF THE EMBODIMENTS

Exemplary embodiments of the disclosure will be described below with reference to the drawings.

Figure 1A:
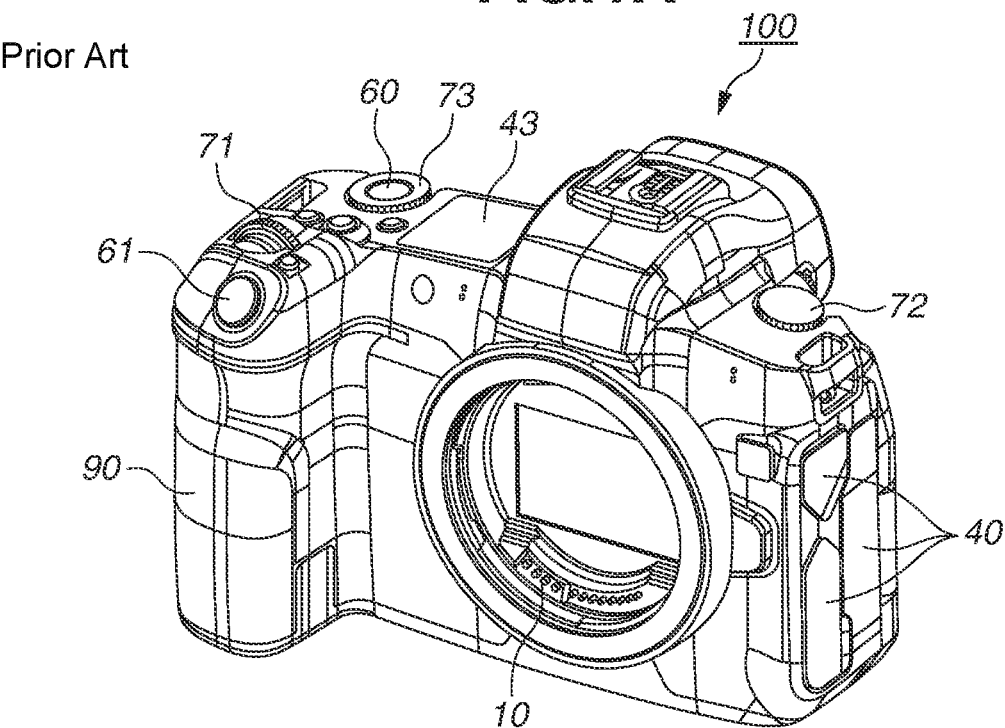
FIGS. 1A and 1B are perspective views of an image apparatus.
Figure 1B:
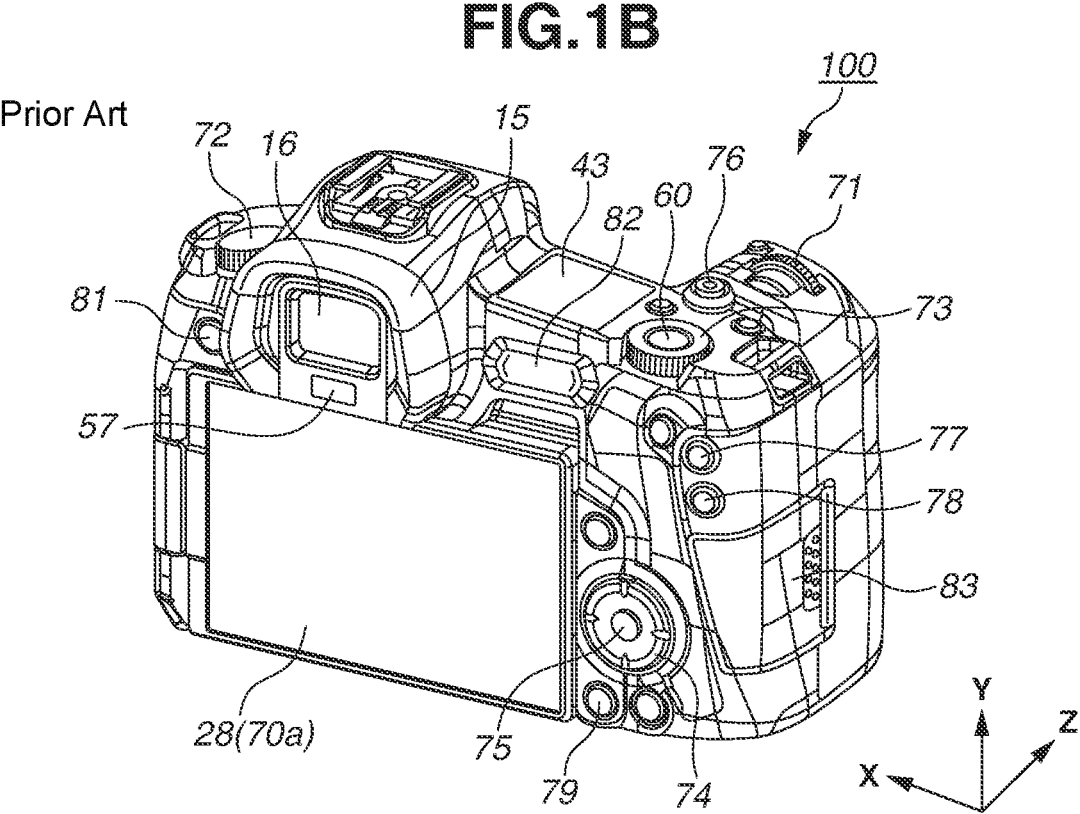

FIGS. 1A and 1B each illustrate an external view of an image apparatus 100 as an example of an apparatus to which one embodiment of the disclosure is applicable. FIG. 1A is a front perspective view of the image apparatus 100, and FIG. 1B is a rear perspective view of the image apparatus 100.

As illustrated in FIGS. 1A and 1B, a display unit 28 is a display unit that displays images and various information and is provided on a rear surface of the image apparatus 100. A touch panel 70a can detect a touch operation on a display surface (operation surface) of the display unit 28. An outer finder display unit 43 is a display unit provided on an upper surface of the image apparatus 100, and displays various setting values, such as a shutter speed and aperture, for the image apparatus 100. A shutter button 61 is an operation unit for issuing an image capturing instruction. A mode selection switch 60 is an operation unit for switching among various modes. Terminal covers 40 are covers for protecting connectors (not illustrated) such as a connection cable for connecting the image apparatus 100 with an external apparatus.

An electronic main dial 71 is a rotational operation member included in an operation unit 70. For example, the setting values such as the shutter speed and the aperture can be changed by turning the electronic main dial 71. A power supply switch 72 is an operation member for turning on and off a power supply of the image apparatus 100. An electronic sub-dial 73 is a rotational operation member included in the operation unit 70. The electronic sub-dial 73 can be used to, for example, move a selection frame and feed images. A four-way operational key 74 is a four-way operational key (four-direction key) that is included in the operation unit 70 and is configured in such a manner that an upper part, a lower part, a left part, and a right part of the key can be pressed, so that processing corresponding to the pressed part of the key is performed. A set button 75 is a push button that is included in the operation unit 70 and is mainly used to determine a selection.

A moving image button 76 is used to issue an instruction to start or stop capturing (recording) of a moving image. An auto exposure (AE) lock button 77 is included in the operation unit 70. An exposure state can be fixed by pressing the AE lock button 77 in an image capturing standby state. A magnifying button 78 is an operation button that is included in the operation unit 70 and is used to turn on and off a magnifying mode in live view (LV) display of an image capturing mode. A LV image can be magnified or demagnified by operating the electronic main dial 71 after the magnifying mode is turned on. In a reproduction mode, the magnifying button 78 functions as an operation button to magnify a reproduced image and to increase a magnification ratio. A reproduction button 79 is an operation button that is included in the operation unit 70 and switches an operation mode between the image capturing mode and the reproduction mode. The operation mode can be shifted to the reproduction mode by pressing the reproduction button 79 in the image capturing mode, so that the latest image out of images recorded on a recording medium 200 can be displayed on the display unit 28. A menu button 81 is included in the operation unit 70. When the menu button 81 is pressed, a menu screen that allows various settings is displayed on the display unit 28. A user can intuitively make various settings using the menu screen displayed on the display unit 28, the four-way operational key 74, and the set button 75.

A touch bar 82 is a line-shaped touch operation member (line touch sensor) configured to receive a touch operation. The touch bar 82 is disposed at a position that can be touched with the thumb of the right hand of a user who is gripping a grip portion 90. The touch bar 82 can receive a tap operation (an operation of touching and releasing the touch bar 82 without moving a touch position within a predetermined time period), a slide operation to left and right (an operation of touching the touch bar 82 and moving a touch position while touching the touch bar 82), or the like. The touch bar 82 is an operation member that is different from the touch panel 70a and does not have a display function.

A communication terminal 10 is a communication terminal for the image apparatus 100 to communicate with a (detachable) lens. An eyepiece unit 16 is an eyepiece unit of an eyepiece finder (peep-type finder). The user can visually observe an image displayed on an internal electronic viewfinder (EVF) 29 through the eyepiece unit 16. An eye approach detection unit 57 is an eye approach detection sensor for detecting whether user's eyes have approached the eyepiece unit 16. A lid 83 is a lid that covers a slot in which the recording medium 200 is stored. The grip portion 90 is a holding portion having a shape that allows the user to easily grip the grip portion 90 with the user's right hand when the user holds the image apparatus 100.

The shutter button 61 and the electronic main dial 71 are disposed at positions where the user can operate the shutter button 61 and the electronic main dial 71 with the index finger of the right hand in a state where the user holds the image apparatus 100 by gripping the grip portion 90 with the little finger, the ring finger, and the middle finger of the right hand. In the same state, the electronic sub-dial 73 and the touch bar 82 are disposed at positions where the user can operate the electronic sub-dial 73 and the touch bar 82 with the thumb of the right hand.

Figure 2A:
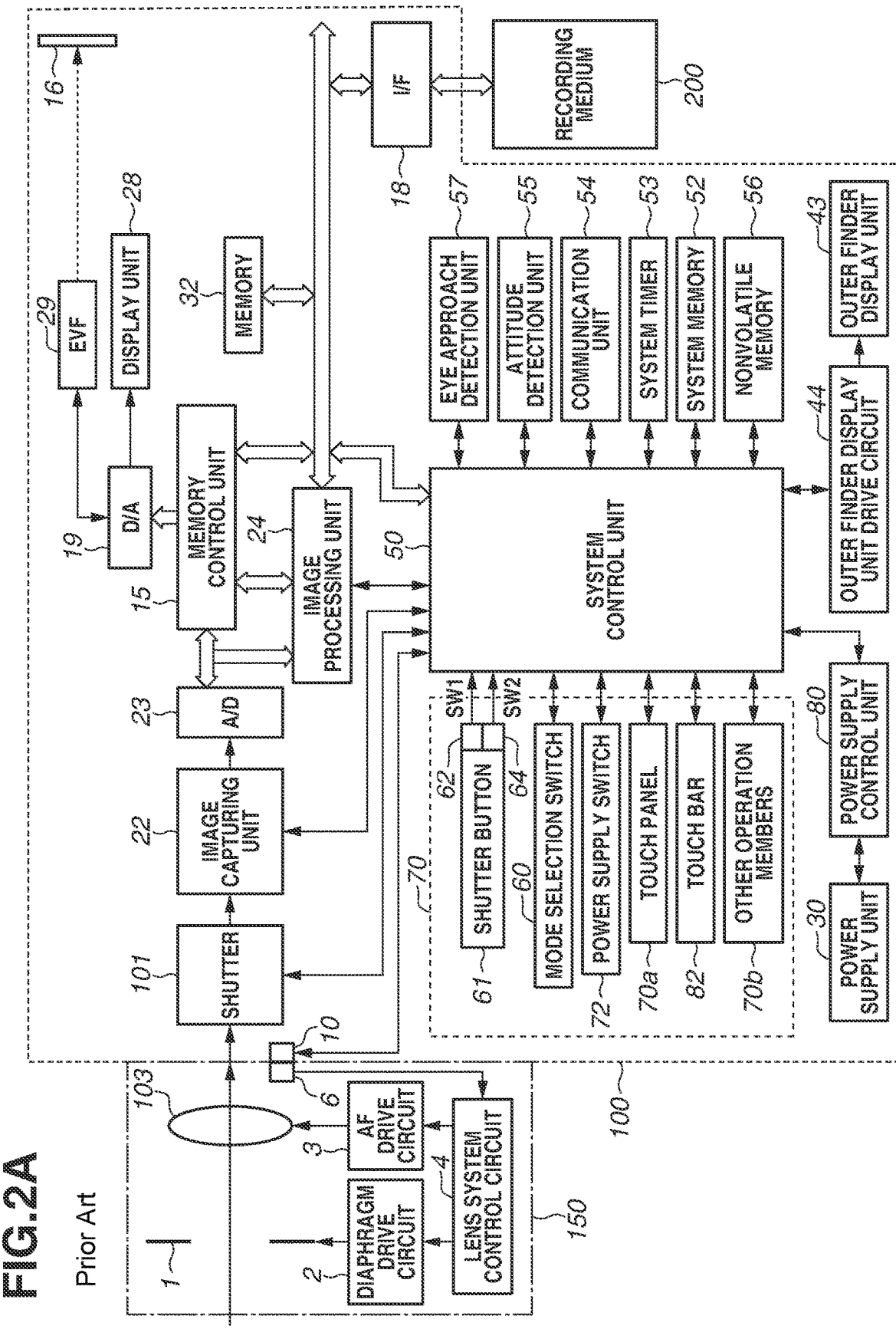
FIGS. 2A and 2B are block diagrams each illustrating a configuration example of the image apparatus.
Figure 2B:
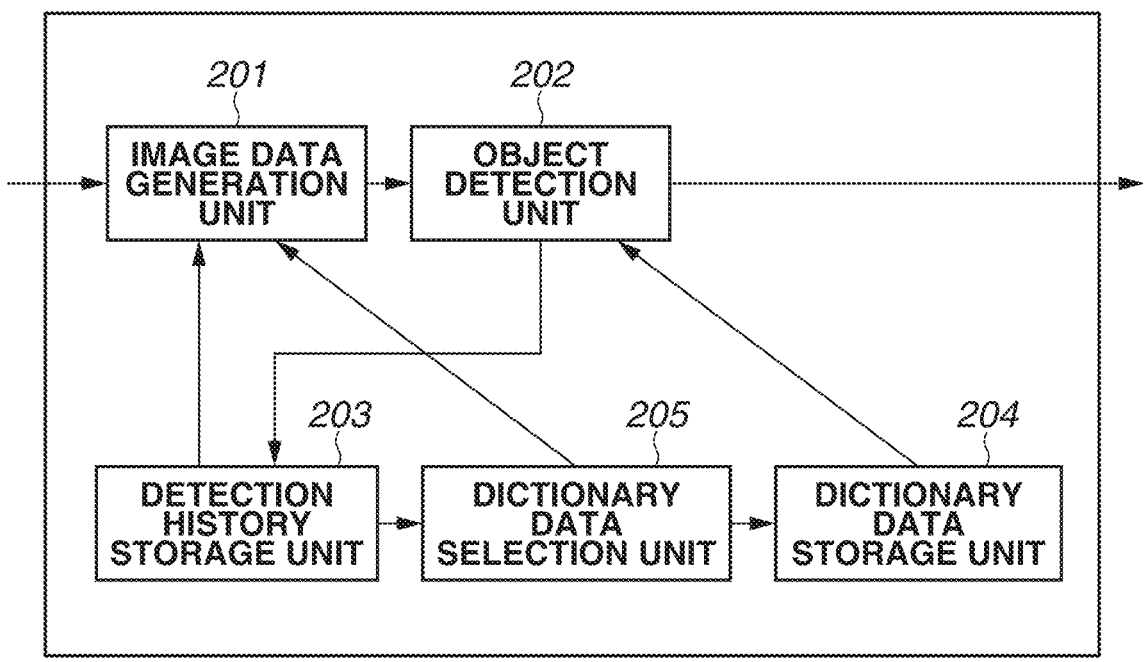

FIG. 2A is a block diagram illustrating a configuration example of the image apparatus 100 according to the present exemplary embodiment. As illustrated in FIGS. 2A and 2B, a lens unit 150 is a lens unit on which an interchangeable image capturing lens is mounted. A lens 103 is generally composed of a plurality of lenses, but herein, only one lens is illustrated for ease of illustration. A communication terminal 6 is a communication terminal for the lens unit 150 to communicate with the image apparatus 100. The communication terminal 10 is a communication terminal for the image apparatus 100 to communicate with the lens unit 150. The lens unit 150 communicates with a system control unit 50 via the communication terminals 6 and 10. A lens system control circuit 4 that is included in the lens unit 150 controls a diaphragm 1 via a diaphragm drive circuit 2 to displace the position of the lens 103 via an autofocus (AF) driving circuit 3, thereby bringing an object image in focus.

A shutter 101 is a focal plane shutter capable of freely controlling an exposure time of an image capturing unit 22 under control of the system control unit 50.

The image capturing unit 22 is an image sensor that converts an optical image into an electric signal, and includes, for example, a charge-coupled device (CCD) sensor or a complementary metal-oxide semiconductor (CMOS) sensor. The image capturing unit 22 may include an image sensing plane phase difference sensor that outputs defocus amount information to the system control unit 50. An analog-to-digital (A/D) converter 23 converts an analog signal into a digital signal. The A/D converter 23 is used to convert an analog signal output from the image capturing unit 22 into a digital signal.

An image processing unit 24 performs predetermined pixel interpolation, resize processing such as reduction, and color conversion processing on data from the A/D converter 23 or data from a memory control unit 15. The image processing unit 24 also performs predetermined calculation processing using captured image data. The system control unit 50 performs exposure control and ranging control based on a calculation result obtained by the image processing unit 24. Thus, through-the lens (TTL) AF processing, AE processing, and flash pre-emission (EF) processing are performed. Further, the image processing unit 24 performs predetermined calculation processing using captured image data, and performs TTL auto white balance (AWB) processing based on an obtained calculation result.

The data output from the A/D converter 23 is directly written into a memory 32 via the image processing unit 24 and the memory control unit 15, or via the memory control unit 15. The memory 32 stores image data that is obtained by the image capturing unit 22 and is converted into digital data by the A/D converter 23 and also stores image data to be displayed on the display unit 28 and the EVF 29. The memory 32 has a storage capacity sufficient for storing a predetermined number of still images and a moving image and sound for a predetermined period of time.

The memory 32 also functions as an image display memory (video memory). A digital-to-analog (D/A) converter 19 converts image display data stored in the memory 32 into an analog signal, and supplies the analog signal to each of the display unit 28 and the EVF 29. Thus, the image data for display written into the memory 32 is displayed on the display unit 28 and the EVF 29 via the D/A converter 19. The display unit 28 and the EVF 29 performs display depending on the analog signal from the D/A converter 19 on a display such as a liquid crystal display (LCD) or an organic electroluminescence (EL) display. Digital signals that are obtained by converting analog signals once by the A/D converter 23 and are accumulated in the memory 32 are converted into analog signals by the D/A converter 19 and are sequentially transferred to and displayed on the display unit 28 or the EVF 29 to perform LV display. An image displayed in live view is hereinafter referred to as a LV image.

The outer finder display unit 43 displays various setting values such as the shutter speed and the aperture, for the image apparatus 100 via an outer finder display unit drive circuit 44.

A nonvolatile memory 56 is an electrically erasable and recordable memory. For example, an electrically erasable programmable read-only memory (EEPROM) can be used. The nonvolatile memory 56 stores a constant for operation, a program, and the like for the system control unit 50. The program described herein refers to a program for executing various flowcharts to be described below in the present exemplary embodiment.

The system control unit 50 is a control unit including at least one processor or circuit, and controls the overall operation of the image apparatus 100. Processing according to the present exemplary embodiment to be described below is implemented by executing the program recorded on the above-described nonvolatile memory 56. For example, a random access memory (RAM) is used as a system memory 52. A constant and a variable for operation of the system control unit 50, a program read from the nonvolatile memory 56, and the like are loaded into the system memory 52. The system control unit 50 also controls the display by controlling the memory 32, the D/A converter 19, the display unit 28, and the like.

A system timer 53 is a time measurement unit that measures the time used for various control operations and measures the time of a built-in clock.

The operation unit 70 is an operation unit for inputting various operation instructions to the system control unit 50.

The mode selection switch 60 is an operation member included in the operation unit 70, and switches the operation mode of the system control unit 50 to one of a still image capturing mode, a moving image capturing mode, the reproduction mode, or the like. The still image capturing mode includes an auto image capturing mode, an auto scene determination mode, a manual mode, an aperture priority mode (Av mode), a shutter speed priority mode (Tv mode), and a program AE mode (P mode). The still image capturing mode also includes various scene modes for making image capturing settings for each image capturing scene, and custom modes. The user can directly switch to any one of the modes using the mode selection switch 60. The user may also switch to an image capturing mode list screen once using the mode selection switch 60, and then may select any one of the plurality of modes displayed on the image capturing mode list screen and switch to the selected mode using another operation member. Similarly, the moving image capturing mode may include a plurality of modes.

A first shutter switch 62 is turned on in a mid-operation state of the shutter button 61 provided on the image apparatus 100, i.e., in what is called a half press state (image capturing preparation instruction), and generates a first shutter switch signal SW1. The first shutter switch signal SW1 is used to start an image capturing preparation operation such as AF processing, AE processing, AWB processing, and EF processing.

A second shutter switch 64 is turned on when the operation of the shutter button 61 is completed, i.e., in what is called a full press state (image capturing instruction), and generates a second shutter switch signal SW2. The second shutter switch signal SW2 causes the system control unit 50 to start a series of image capturing processing operations from reading of signals from the image capturing unit 22 to writing of captured images into the recording medium 200 as image files.

The operation unit 70 includes various operation members each as an input unit that receives an operation from the user.

The operation unit 70 includes at least the following operation members: the shutter button 61, the electronic main dial 71, the power supply switch 72, the electronic sub-dial 73, the four-way operational key 74, the set button 75, the moving image button 76, the AE lock button 77, the magnifying button 78, the reproduction button 79, the menu button 81, and the touch bar 82. Other operation members 70b are collectively displayed as operation members that are not individually illustrated in the block diagram.

A power supply control unit 80 includes a battery detection circuit, a direct current (DC)-DC converter, a switch circuit for switching blocks to be energized, and the like, and detects whether a battery is attached, the type of battery, and a remaining battery capacity. The power supply control unit 80 controls the DC-DC converter based on a detection result and an instruction from the system control unit 50, and supplies a required voltage to each unit including the recording medium 200 for a required period of time. A power supply unit 30 is composed of a primary battery such as an alkaline battery or lithium battery, a secondary battery such as a nickel-cadmium (NiCd) battery, a nickel-metal hydride (NiMH) battery, or a lithium battery, and an alternating current (AC) adaptor.

A recording medium interface (I/F) 18 is an interface with the recording medium 200 such as a memory card or a hard disk. The recording medium 200 is a recording medium such as a memory card for recording captured images, and includes a semiconductor memory, a magnetic disk, or the like.

A communication unit 54 is connected by a wireless connection or with a cable to transmit and receive video signals and audio signals. The communication unit 54 is also connectable to a wireless local area network (LAN) and the Internet. The communication unit 54 can communicate with an external apparatus by Bluetooth® or Bluetooth® Low Energy. The communication unit 54 can transmit images (including a LV image) captured by the image capturing unit 22 and images recorded on the recording medium 200, and can receive images and various kinds of information from an external apparatus.

An attitude detection unit 55 detects an attitude of the image apparatus 100 with respect to the direction of gravity. Based on the attitude detected by the attitude detection unit 55, it can be determined whether an image captured by the image capturing unit 22 is an image captured by image apparatus 100 held horizontally, or an image captured by the image apparatus 100 held vertically. The system control unit 50 can add orientation information based on the attitude detected by the attitude detection unit 55 to an image file of an image captured by the image capturing unit 22, and can record the image by rotating the image. As the attitude detection unit 55, an acceleration sensor, a gyroscope sensor, or the like can be used. A motion (e.g., pan, tilt, lift, or still) of the image apparatus 100 can also be detected using the acceleration sensor or the gyroscope sensor being the attitude detection unit 55.

FIG. 2B illustrates a characteristic configuration of the image processing unit 24 according to the present exemplary embodiment. The image processing unit 24 includes an image data generation unit 201, an object detection unit 202, a detection history storage unit 203, a dictionary data storage unit 204, and a dictionary data selection unit 205. The image data generation unit 201, the object detection unit 202, the detection history storage unit 203, the dictionary data storage unit 204, and the dictionary data selection unit 205 may constitute part of the system control unit 50, or may be provided separately from the image processing unit 24 and the system control unit 50. The image processing unit 24 may be mounted on, for example, a smartphone or a tablet terminal.

The image processing unit 24 transmits image data generated based on the data output from the A/D converter 23 to the image data generation unit 201 in the image processing unit 24.

In a case where dictionary data for entire area detection is selected by the dictionary data selection unit 205 to be described below, the image data generation unit 201 generates image data used in the entire area detection by the object detection unit 202 using the input image data, and transmits the generated image data to the object detection unit 202. On the other hand, in a case where dictionary data for local area detection is selected by the dictionary data selection unit 205, the image data generation unit 201 generates image data used in the local area detection by the object detection unit 202 based on detection histories stored in the detection history storage unit 203 to be described below, and transmits the generated image data to the object detection unit 202. A specific method for generating each image data for the detection will be described below.

The object detection unit 202 receives the dictionary data determined by the dictionary data selection unit 205 from among pieces of dictionary data that are stored in the dictionary data storage unit 204 and are generated by machine learning, and detects an object in the image data received from the image data generation unit 201. The object detection unit 202 estimates the position of the object included in the image data as the detection result, and outputs a result of estimation to the detection history storage unit 203 and to the outside of the configuration illustrated in FIG. 2B.

In the present exemplary embodiment, the object detection unit 202 includes a convolutional neural network (CNN) trained by machine learning, and performs the entire area detection and the local area detection on a specific object. The object on which the entire area detection and the local area detection can be performed is based on the dictionary data stored in the dictionary data storage unit 204. In the present exemplary embodiment, the object detection unit 202 is configured to use different CNNs for the entire area detection and the local area detection. Further, the object detection unit 202 may be configured to use a different CNN depending on a detectable object. The object detection unit 202 may be implemented by a circuit dedicated to estimation processing using a graphics processing unit (GPU) or a CNN.

A CNN can be trained by machine learning by any technique. For example, a predetermined computer, such as a server, may train the CNN by machine learning, and the image apparatus 100 may acquire the trained CNN from the predetermined computer. In the present exemplary embodiment, the predetermined computer receives image data for training as an input and performs supervised learning using position information or the like of an object corresponding to the image data for training as training data (annotation), thereby training the CNN of the object detection unit 202. In the manner as described above, the trained CNN is generated. The CNN may be trained by the image apparatus 100 or image processing apparatus described above.

As described above, the object detection unit 202 includes a CNN (trained model) trained by machine learning. The object detection unit 202 receives image data as an input, estimates the position, size, reliability, and the like of the object, and outputs estimated information. The CNN may be, for example, a network in which a fully connected layer and an output layer are connected to a layer structure in which a convolution layer and a pooling layer are alternately stacked. In this case, for example, an error back propagation algorithm can be applied as a training technique for the CNN. The CNN may be a neocognitron CNN including a set of a feature detection layer (S layer) and a feature integration layer (C layer). In this case, a training technique called "Add-if Silent" can be applied as a training method of the CNN.

Any trained model other than the trained CNN may be used as the object detection unit 202. For example, a trained model generated by machine learning such as a support vector machine or a decision tree may be applied to the object detection unit 202. A technique other than the trained model generated by machine learning may be applied to the object detection unit 202. For example, any object detection technique that does not use machine learning may be applied to the object detection unit 202.

The detection history storage unit 203 stores the detection history of an object detected by the object detection unit 202 in the image data. The system control unit 50 transmits the object detection history to each of the image data generation unit 201 and the dictionary data selection unit 205. In the present exemplary embodiment, the object detection history includes the dictionary data used for detection, the number of times of detection, the position of each detected object, and an identifier for the image data including the detected object. Alternatively, the object detection history may include at least one of these pieces of data.

The dictionary data storage unit 204 stores dictionary data for detecting a specific object. The system control unit 50 reads dictionary data selected by the dictionary data selection unit 205 from the dictionary data storage unit 204, and transmits the dictionary data to the object detection unit 202. Each dictionary data is, for example, data in which features of each area of the specific object are registered. Further, dictionary data for each object or dictionary data for each object area may be used to detect various types of object. Accordingly, the dictionary data storage unit 204 stores a plurality of pieces of dictionary data. The dictionary data storage unit 204 stores dictionary data for detecting various types of object, such as dictionary data for detecting "person", dictionary data for detecting "animal", and dictionary data for detecting "vehicle". The dictionary data storage unit 204 also stores dictionary data for detecting "bird" separately from the dictionary data for detecting "animal" since birds have distinctive shapes among animals and detection of birds is highly demanded.

The dictionary data for detecting "vehicle" can be further divided into dictionary data for detecting specific objects, such as "automobile", "motorcycle", "train", and "aircraft", and the dictionary data for the specific objects can be individually stored.

Further, in the present exemplary embodiment, dictionary data for entire area detection and dictionary data for local area detection are prepared for each of the specific objects described above. The entire area of a specific object may literally refer to an area including the entire object, or may be set as an area including a central portion of the object, i.e., the body of the object. For example, the entire area of an object related to "vehicle" may be the vehicle body of an automobile or motorcycle, the front car of a train, and the fuselage of an aircraft. The entire area can be determined for each type of the object. The local area is defined as a partial area in an object identified in the entire area. The local area is set as an area included in the entire area, and for example, "human pupil" is set as a local area for "entire human face" set as the entire area, or "pupil" is set as a local area for "entire animal face" set as the entire area. Similarly, as for "bird", "bird's pupil" can be set as a local area to be detected in "entire area of a bird" or "entire bird face" set as the entire area, and the dedicated dictionary data for "bird" is stored. A positional relationship between the local area and the entire area may be such that the local area is not included in the entire area. For example, a positional relationship in which "driver's helmet" that is set as a local area and falls outside of an image of the body of a motorcycle is not included in "entire body of a motorcycle" set as the entire area may be used.

A positional relationship in which a local area is not always present in the entire area of an object may also be used. For example, a positional relationship in which "driver's helmet" that is a local area limited to an "open-wheel car", which is one type of automobile, is not present in "entire body of an automobile" set as the entire area may also be used.

As described above, the dictionary data for local area detection is based on the premise that the local area is a partial area of an object detected in the entire area. Accordingly, in the present exemplary embodiment, the dictionary data used for the local area detection is generated by using an image in which an object detected as the entire area is a background as an input image and the position or size of a local area in the image as an annotation.

The entire area of the object that has been detected based on the plurality of pieces of dictionary data stored in the dictionary data storage unit 204 can be used as a focus detection area. For example, in a composition in which an obstacle is present on the front side and an object is present on the back side, the object can be in focus by bringing the detected entire area in focus.

However, for example, if a difference in depth of focus within the entire area is large, there is an issue of determining which part of the entire area is to be brought into focus. To address the issue, the detection range may be limited using the local area detection to make it possible to bring a more specific position into focus. The specific position may be, for example, "driver's seat" on a train or "cockpit" of an aircraft. Such a specific position is not brought into focus based on information about the entire area and the depth of focus in the area. Further, in the case of "vehicle" such as a motorcycle, the position desired to be brought into focus may be different depending on whether there is a person on the vehicle. The entire area detection and the local area detection are performed using the dictionary data in which "entire body of a motorcycle" is set as the entire area and "driver's helmet" is set as the local area, so that it possible to switch the position to be brought into focus of the same object depending on whether a driver is present.

In the present exemplary embodiment, the plurality of pieces of dictionary data used for detection by the object detection unit 202 is generated by machine learning, but instead, dictionary data generated by a rule-based method may be used. The dictionary data generated by the rule-based method stores, for example, an image of an object to be detected or a feature amount specific to the object, determined by a designer. The image or feature amount in the dictionary data is compared with the image or feature amount in image data obtained by image capturing, so that it is possible to detect the object. The rule-based dictionary data is less complicated than a dictionary data set using a trained model by machine learning, and the object detection using the rule-based dictionary data can be performed with a smaller amount of data and at a higher processing speed (lower processing load) than those of the trained model.

The dictionary data selection unit 205 selects dictionary data to be subsequently used based on the detection histories stored in the detection history storage unit 203, and notifies the dictionary data storage unit 204 of the selected dictionary data.

In the present exemplary embodiment, dictionary data for various types of objects and dictionary data for each object area are individually stored in the dictionary data storage unit 204. The object detection is performed a plurality of times by switching among the plurality of pieces of dictionary data on the same image data. The dictionary data selection unit 205 determines a dictionary data switching sequence based on the detection histories stored in the detection history storage unit 203 and the user's selection to be described below, and determines the dictionary data to be used according to the determined sequence. An example of the dictionary data switching sequence will be described below.

The dictionary data storage unit 204 individually stores dictionary data for detecting various types of objects and dictionary data for detecting each object area. The dictionary data selected by the dictionary data selection unit 205 is switched depending on objects detected in the past, the type of dictionary data used in detection thereof, the type of object to be preferentially detected, or a combination thereof. The type of object to be preferentially detected described above may be selected in advance by the user. The user may designate an object in a live view screen displayed on the display unit 28. Further, the user may determine in advance whether to perform the local area detection collectively or for each type of dictionary data for entire area detection described above. In this case, the system control unit 50 may cause the display unit 28 to display information about the user's selection and the dictionary data selected by the dictionary data selection unit 205.

Figure 3A:
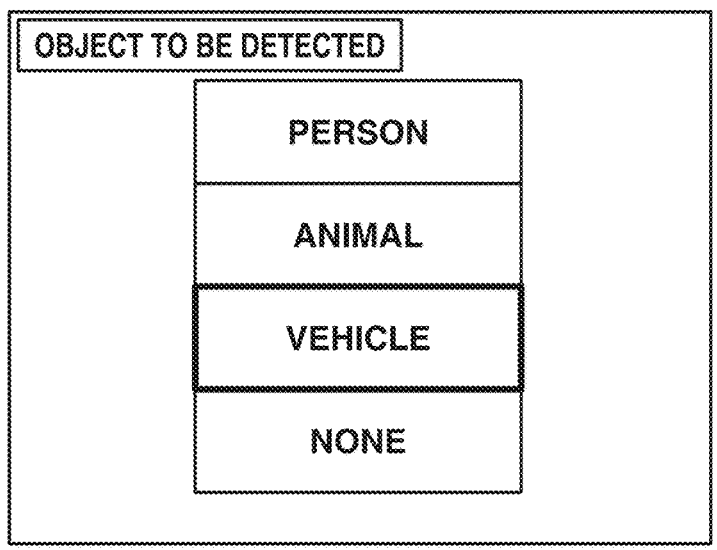
FIGS. 3A to 3C each illustrate an example of a method for setting a detection target by a user.
Figure 3B:
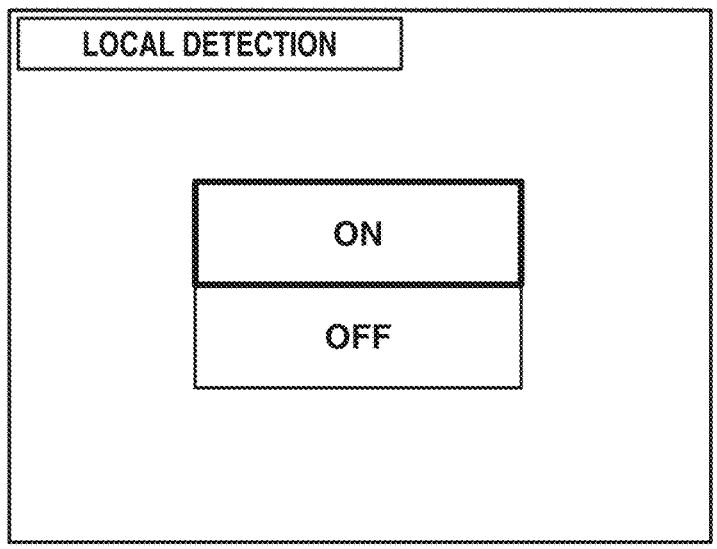
Figure 3C:
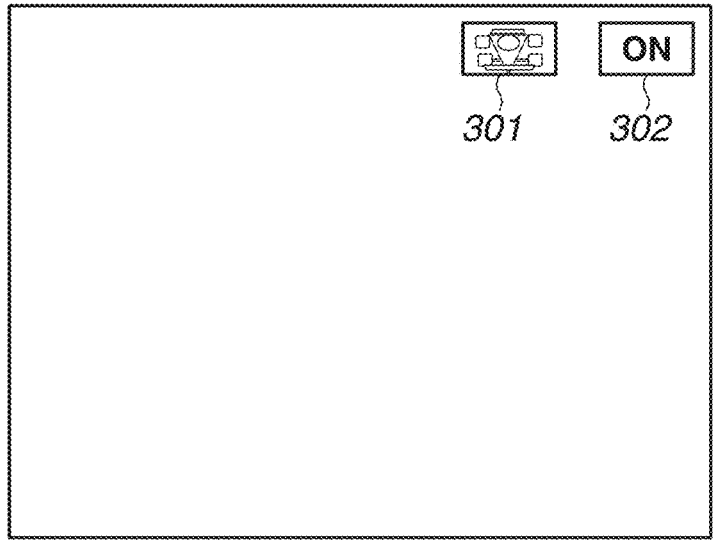

FIGS. 3A to 3C each illustrate an example of a menu screen displayed on the display unit 28 on which the user selects the type of object to be preferentially detected and whether to perform the local area detection. FIG. 3A illustrates a setting screen for selecting the detected object displayed on the display unit 28. The user selects an object to be preferentially detected from among detectable specific objects (e.g., vehicle, animal, and person) by an operation on the operation unit 70. In the present exemplary embodiment, "vehicle" is selected. FIG. 3B illustrates a setting screen displayed on the display unit 28 to select whether to perform the local area detection. The user selects on or off of the local area detection by an operation on the operation unit 70. In the present exemplary embodiment, on is selected for the local area detection. FIG. 3C illustrates a live view screen displayed on the display unit 28 in a state where a preferentially detected object setting and a local area detection setting are made. The selection result of the object to be preferentially detected is displayed as an object icon 301, and the selection result as to whether to perform the local area detection (or whether to display the detection result) is displayed as a local area detection on/off icon 302 on the display unit 28. The display enables the user to confirm the settings made by the user on the live view screen. An operation to be performed when a vehicle is selected as an object to be preferentially detected and the local area detection on is selected in the present exemplary embodiment is described below).

FIG. 4 is a flowchart illustrating a characteristic processing procedure of the disclosure performed by the image apparatus 100 according to the present exemplary embodiment. Each step in the flowchart is executed by the system control unit 50 or by each unit in response to an instruction from the system control unit 50. At the start of the flowchart, the power supply of the image apparatus 100 is in a state of being turned on and capable of issuing an instruction to start still image or moving image capturing (recording) by an operation via the operation unit 70 in a live view image capturing mode.

A series of processing operations from steps S401 to S413 in FIG. 4 is processing operations to be performed when an image corresponding to one frame (image data representing one image) is captured by the image capturing unit 22 of the image apparatus 100. However, the series of processing operations is not limited to this example. The series of processing operations from step S401 to step S413 may be performed on a plurality of frames. More specifically, an object detection result in a first frame may be reflected in any one of the second and subsequent frames.

In step S401, the system control unit 50 acquires captured image data that is captured by the image capturing unit 22 and is output from the A/D converter 23.

In step S402, the image processing unit 24 resizes the image data to an image size (e.g., Quarter Video Graphics Array (QVGA)) that can be easily processed, and transmits the resized image data to the image data generation unit 201.

In step S403, the dictionary data selection unit 205 selects dictionary data to be used for object detection, and transmits selection information indicating the selected dictionary data to each of the dictionary data storage unit 204 and the image data generation unit 201.

In step S404, the system control unit 50 determines whether the dictionary data for entire area detection is selected by the dictionary data selection unit 205 in step S403. In step S404, if it is determined that the dictionary data for entire area detection is selected (YES in step S404), the processing proceeds to step S405. If the dictionary data for entire area detection is not selected (NO in step S404), the processing proceeds to step S408.

In step S405, since the dictionary data for entire area detection is selected, the image data generation unit 201 performs processing of resizing the image data to a size to be input to the object detection unit 202 on the entire area of the image, and transmits the resized image data to the object detection unit 202.

In step S406, the object detection unit 202 outputs, to the system control unit 50, information indicating the position, size, reliability, and the like of the object detected using the dictionary data for entire area detection for detecting the entire area of a specific object stored in the dictionary data storage unit 204. In this case, the output from the object detection unit 202, the type of dictionary data used for detection, and the identifier for the image data used for detection are stored in the detection history storage unit 203. Further, in this case, the system control unit 50 may cause the display unit 28 to display part or all of the information output from the object detection unit 202. The above-described display method may be changed depending on the dictionary data used for detection.

In step S407, it is determined whether detection processing is performed using all necessary dictionary data for image data (image data of the same frame) with the same identifier based on the detection histories stored in the detection history storage unit 203. If it is determined that detection processing is performed using all necessary dictionary data (YES in step S407), the processing is terminated. If it is determined that detection processing is not performed using all necessary dictionary data (NO in step S407), the processing returns to step S403 to select dictionary data to be subsequently used.

In step S408, it is determined whether the local area detection function is on. If it is determined that the local area detection function is on (YES in step S408), the processing proceeds to step S409. If the local area detection function is not on (NO in step S408), the processing returns to step S407.

In step S409, it is determined whether the entire area has been detected in the previous detection of image data with the same identifier as that of the image data on which detection processing is to be performed based on the detection histories stored in the detection history storage unit 203. If it is determined that the entire area has been detected (YES in step S409), the processing proceeds to step S410. If it is determined that the entire area has not been detected (NO in step S409), the processing proceeds to step S412.

In step S410, the image data generation unit 201 performs trimming processing on the image data for object detection based on the detection result of the entire area of image data with the same identifier (in the same frame) as that of the image data on which detection processing is to be performed. The detection result is stored in the detection history storage unit 203. Specifically, an area that is wider by a predetermined angle of view (a predetermined number of pixels) than the entire area of an object is set as a trimming area in the area in which the entire area of the object is detected. An amount by which the trimming area is set to be larger than the detected entire area may be set to a different size or ratio depending on a target object. In step S410, the image data on which the trimming processing has been performed is further resized to the input size of the object detection unit 202, and the image data is transmitted to the object detection unit 202.

In step S411, the object detection unit 202 outputs, to the system control unit 50, information indicating the position, size, reliability, and the like of the object detected using the dictionary data for local area detection stored in the dictionary data storage unit 204. In this case, the output from the object detection unit 202, the type of dictionary data used for detection, and the identifier for the image data used for detection are stored in the detection history storage unit 203. Further, in this case, the system control unit 50 may cause the display unit 28 to display a part or all of the information output from the object detection unit 202. The above-described display method may be changed depending on the dictionary data used for detection.

In step S412, it is checked whether there is an entire area detection result or a local area detection result for the same object in a previous frame based on the detection histories stored in the detection history storage unit 203. In the present exemplary embodiment, the term previous frame refers to a frame corresponding to image data that is captured immediately preceding in time series the image data with the same identifier and is output to the image processing unit 24. However, the number of frames preceding the current frame may is not particularly limited as long as the previous frame is a frame preceding the current frame in time series. If it is determined that there is a detection result (YES in step S412), the processing proceeds to step S413. If there is no detection result (NO in step S412), the processing returns to step S407.

In step S413, trimming processing corresponding to the angle of view input to the object detection unit 202 is performed as needed. In the present exemplary embodiment, the image data generation unit 201 performs the trimming processing on the image data based on the detection result of image data in the previous frame stored in the detection history storage unit 203. In step S413, the image data on which the trimming processing has been performed is further resized to the input size of the object detection unit 202, and the resized image data is transmitted to the object detection unit 202.

By the processing of steps S409, S410, S412, and S413, it can be expected that the local area detection performance using dictionary data generated by machine learning can be improved.

The association between the improvement in the local area detection performance described above and steps S412 and S413 will be described. In the present exemplary embodiment, in step S412, it is checked whether the entire area of the object is detected in the previous frame in the image data with the same identifier as that of the image data on which detection processing is to be performed based on detection histories stored in the detection history storage unit 203. If the entire area of the object is detected in the previous frame (YES in step S412), the processing proceeds to step S413. In step S413, as described above, the image data is resized with regard to the area corresponding to the angle of view of the entire image, or the image data is resized based on the position and width of the entire area of the object previously detected.

Dictionary data generated by machine learning can be generated by extracting features common to a specific object from a large amount of image data in which the specific object is present. Examples of the common features include not only the size, position, color, and the like of the object, but also an area outside the specific object such as a background. Accordingly, the detection performance (detection accuracy) tends to increase with a smaller amount of training as the background in which the detected object is present is limited. On the other hand, if training is performed to detect a specific object regardless of the background, the versatility to the image capturing scene is high, but the detection accuracy is not much increased. The detection performance tends to increase as the amount of image data to be used for generating dictionary data increases and as a variety of types of image data increases. Meanwhile, by limiting the size and position of the detection area of the object to be detected in the image data used for detection to a certain size or position, the detection performance can be increased even when the number of pieces of image data and the number of types of image data for generating the dictionary data are reduced. If part of the object is out of the image data, some of the features of the object are lost, which leads to a decrease in the detection performance.

A larger number of features are generally included in a larger area of an object. In the detection using the dictionary data generated by machine learning as described above, an object having features similar to those of a specific object to be detected using the dictionary data may be erroneously detected in addition to the specific object. An area defined as the local area is narrower than the entire area. A narrower area includes a smaller feature amount. As the feature amount decreases, the number of objects having similar features increases, so that the number of erroneous detections increases.

Figure 5A:
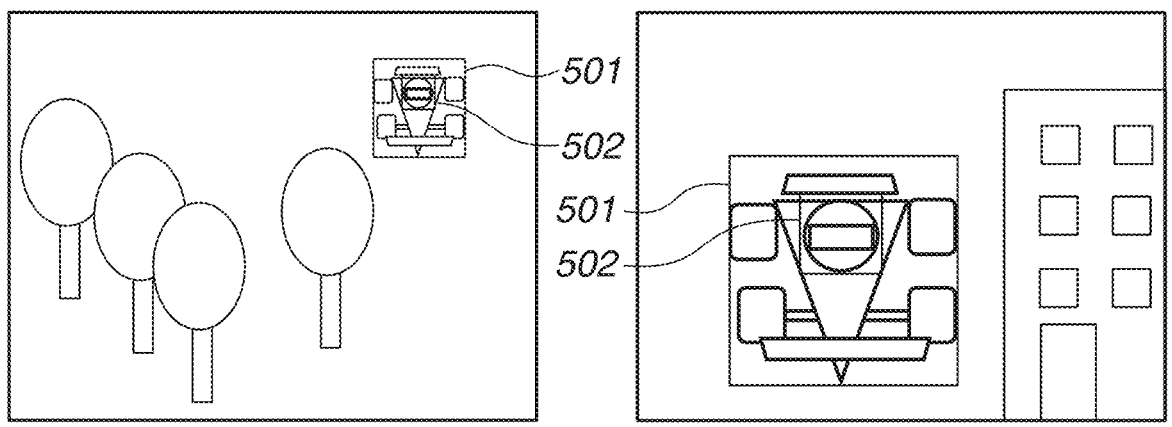
FIGS. 5A and 5B each illustrate an example of a positional relationship between an entire area and a local area.
Figure 5B:
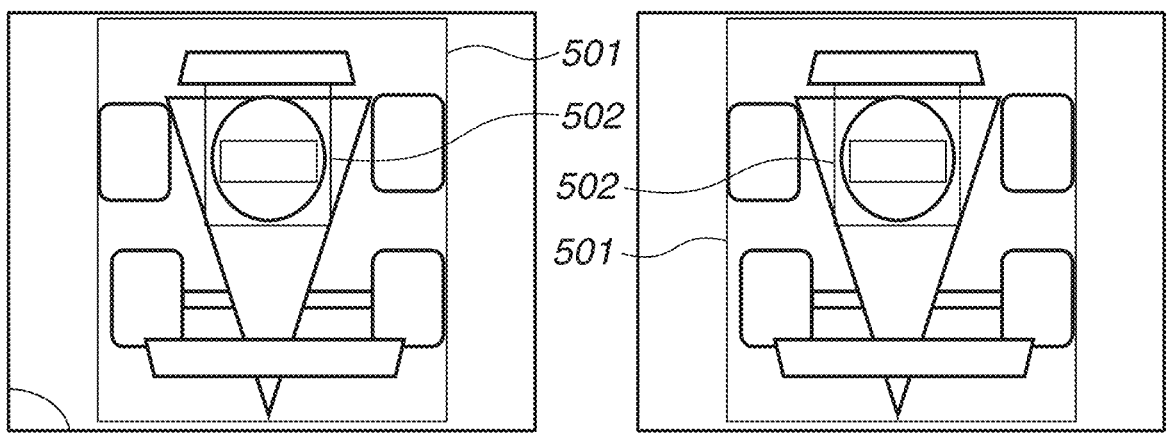

FIGS. 5A and 5B each illustrate an example of a positional relationship between the entire area and the local area when "entire vehicle body" of an automobile is defined as the entire area and "driver's helmet" is defined as the local area. As illustrated in FIGS. 5A and 5B, a local area 502 is included in an entire area 501. FIG. 5A illustrates two pieces of image data indicating that the same vehicle body is located at different positions, at different distances, and in different backgrounds. FIG. 5B illustrates images obtained by trimming the two pieces of image data described above based on the entire area of the automobile. In comparison with FIG. 5A, the image data in which variations of the position, size, and background of the local area are reduced can be generated by trimming the image data based on the entire area as illustrated in the two images of FIG. 5B.

If the local area detection is performed on the entire image data (entire angle of view) regardless of whether there is an entire area detection history, in one embodiment, image data is prepared for various image capturing scenes (including various objects and backgrounds) and to generate dictionary data for detecting the local area while avoiding erroneous detection. On the other hand, in the present exemplary embodiment, if in a scene in which the entire area of the object is detected in the previous frame is no longer detected, i.e., in a scene in which the entire area of the object is too large so that the entire area of the object is out of an image capturing angle of view, the local area is also detected from the entire image. This is because, in this case, it is assumed that the object is sufficiently large and most of the background area is the object area even if the detection of the local area is performed from the entire image. Thus, the detection processing can be performed with a sufficiently high performance even when dictionary data trained based on the premise that the background is the object is used. Alternatively, in another exemplary embodiment, the number of erroneous detections can be reduced and the detection performance can be improved by using, in the local area detection, image data obtained by trimming the current processing target frame based on the position and width of the entire area of the object detected in the previous frame. Further, since variations of the types of image data used for detection can be reduced in the trained model for local area according to the present exemplary embodiment, the amount of image data and annotation data used for learning can be reduced.

Next, the association between the improvement in the local area detection performance described above and step S412 will be described. In the present exemplary embodiment, if the detection histories stored in the detection history storage unit 203 does not include the history of the entire area being detected in the image data with the same identifier as that of the image data on which detection processing is to be performed, it is determined whether to perform local area detection with reference to the previous history.

Figure 6A:
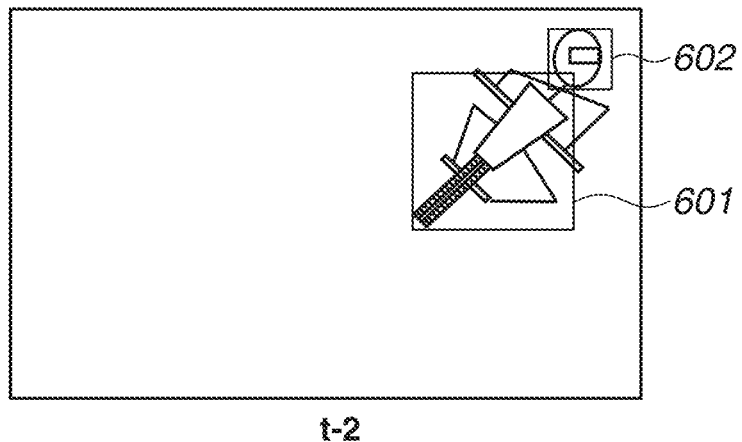
FIGS. 6A to 6C illustrate a time-series change in of captured images when an object image is captured.
Figure 6B:
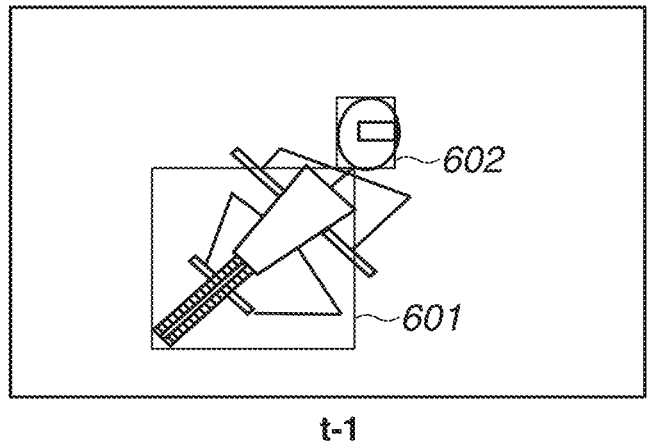
Figure 6C:
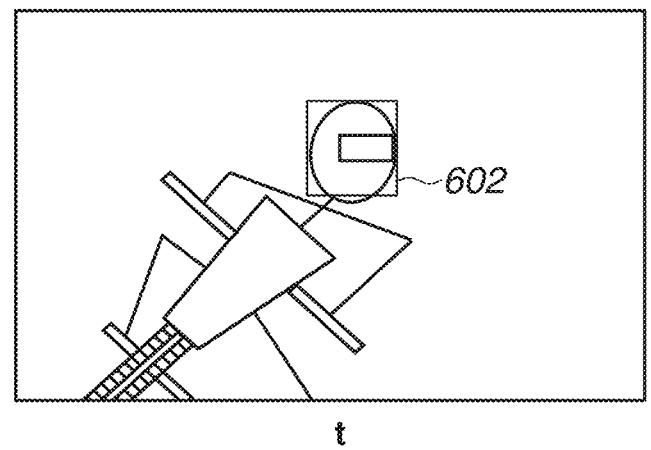

FIGS. 6A to 6C each illustrate an example of a positional relationship between the entire area and the local area when "entire vehicle body" of a motorcycle is defined as the entire area and "driver's helmet" is defined as the local area. As illustrated in FIGS. 6A to 6C, a local area 602 is not included in an entire area 601. FIGS. 6A to 6C illustrate a time-series change in captured image data indicating a state where the object is gradually approaching the image apparatus 100 from FIG. 6A to FIG. 6C. FIG. 6A illustrates an example where the object is small and thus the local area cannot be detected. FIG. 6C illustrates an example where the entire area cannot be detected because part of the object is out of the image data. In the situation where the object is gradually approaching the image apparatus 100 from the back toward the front as illustrated in FIGS. 6A to 6C, if the entire area or local area of the object is detected at a close time as illustrated in FIG. 6B with respect to FIG. 6C, it is highly likely that the object is present in the subsequent image data. Accordingly, the system control unit 50 reads the detection histories of image data in the previous frame stored in the detection history storage unit 203, and determines whether the entire area or local area of the object has been detected in the image data at a close time. If one of the entire area and the local area has been detected, the local area is detected even when the entire area of the object cannot be detected in specific image data. A case where the object is gradually approaching the image apparatus 100 as illustrated in FIGS. 6A to 6C may be assumed as a condition for detecting the local area, and it may be determined whether the entire area of the object gradually increases with a lapse of time. Further, for example, scene switching may be determined by calculating an amount of change of the entire image or the entire area of the object based on the previous image data. As a result, if the scene is largely switched, the local area detection may be omitted even when the entire area or local area is detected in the image data at a close time. In this case, the current image data is compared with the image data at the close time, and it is determined that the scene has been largely switched when the amount of change of the image data is more than or equal to a certain threshold.

By increasing opportunities of detecting a local area from image data in which the local area is highly likely to be present, opportunities of determining a wrong area as the local area when the local area is not present or when another object similar to the local area is present can be reduced. Consequently, the local area detection performance can be improved.

The association between the improvement in the local area detection performance described above and step S413 will be described. In the present exemplary embodiment, it is determined whether the detection histories stored in the detection history storage unit 203 includes the history of the entire area being detected in the image data with the same identifier as that of image data (second image data) to be processed. As a result, if the history is not present, detection processing is performed based on the detection history of the entire area or local area of the previous image data (first image data).

Figure 7A:
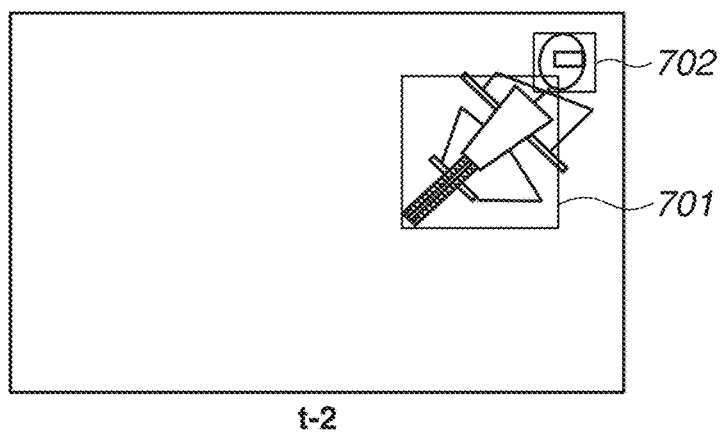
FIGS. 7A to 7D each illustrate an example of image data trimming method used for object detection.
Figure 7B:
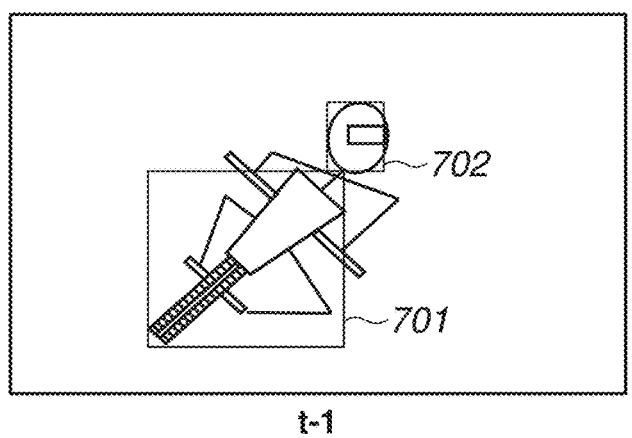
Figure 7C:
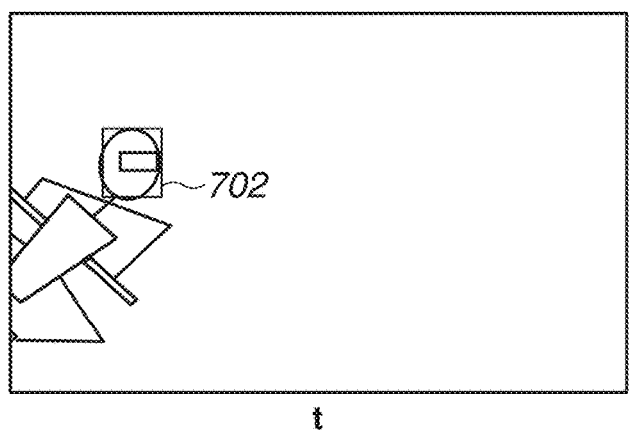
Figure 7D:
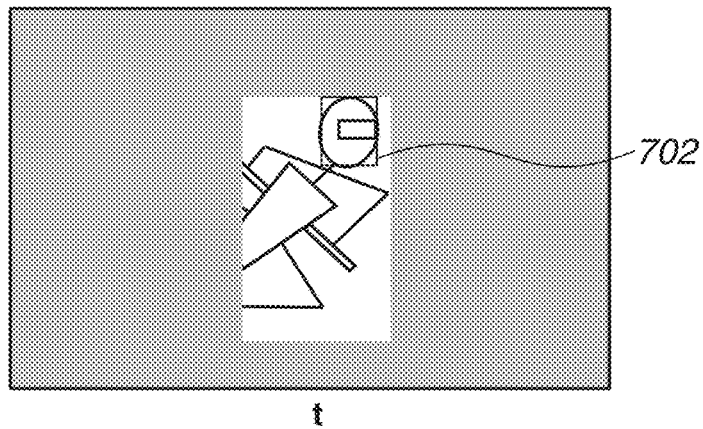

FIGS. 7A to 7C each illustrate an example of a positional relationship between an entire area 701 and a local area 702 when "entire vehicle body" of a motorcycle is defined as the entire area and "driver's helmet" is defined as the local area, similar to the examples in FIGS. 6A to 6C. FIGS. 7A to 7C illustrate a time-series change in captured image data. FIG. 7C illustrates an example where the entire area cannot be detected because part of the vehicle body is out of the image data. In a case where the entire area or local area of the object is detected at a close time in the previous frame, as in FIGS. 7A and 7B with respect to FIG. 7C, it is highly likely that the object is also present in the image at a subsequent time. Further, a position where the object is highly likely to be present in FIG. 7C can be estimated by calculating a movement amount based on the positional relationship between the entire area and the local area detected in the previous frame of the specific object stored in the detection history storage unit 203 and the size of each detected area. FIG. 7D illustrates an example where the image data illustrated in FIG. 7C is trimmed based on the above-described previous detection history so that the local area is at a certain position with a certain size. Trimming the image data based on the previous history as illustrated in FIG. 7D makes it possible to reduce the possibility of another object having features similar to those of the object being present in the image data and to generate image data from which the object can be easily detected. Consequently, the detection performance can be improved.

As in the example illustrated in FIGS. 7A to 7D, the trimming range may be set by estimating and determining the subsequent position of an object based on the positional relationship between the entire area and the local area detected in the previous frame and the movement amount. Further, the trimming range may be determined using the entire area detection result considering a case where the local area detection is not performed at a close time, or a case where the positional relationship between the entire area and the local area varies with time. For example, in the case where the object is approaching the image apparatus 100 as in the example illustrated in FIG. 6C, if the image data is trimmed based on the position of the entire area in the previous frame, the local area may not be within the trimmed image depending on the motion of the object. Accordingly, it may be desirable to check the detection history for the previous image data (first image data) stored in the detection history storage unit 203. As a result, if it is determined that the entire area is not within the image data based on transition of the positions or sizes of the entire area and local area detected in the image data at a close time, the local area detection may be performed without performing trimming.

Next, the sequence of switching among the plurality of pieces of dictionary data on one frame (one image data) performed in step S403 illustrated in FIG. 4 by the image apparatus 100 will be described. If the plurality of pieces of dictionary data is stored in the dictionary data storage unit 204, detection processing can be performed on one frame using the plurality of pieces of dictionary data. On the other hand, the number of times of object detection that can be performed on one frame may be limited due to the image capturing speed or processing speed with regard to moving image data of images and movies recorded in the live view mode in which captured images are sequentially output and processed.

In this case, the type and order of dictionary data used for detection may be determined depending on, for example, objects detected in the past, the type of dictionary data used in detection thereof, the type of an object to be preferentially detected, or whether to perform the local area detection. Depending on the dictionary data switching sequence, when a specific object is included in the frame, dictionary data for object detection corresponding thereto may not be selected, and the detection opportunity can be missed. Accordingly, in one embodiment, the dictionary data switching sequence is switched depending on the setting or scene.

FIGS. 8A to 8E each illustrate an example of the dictionary data switching sequence when "vehicle" is selected as an object to be preferentially detected, for example, in a structure in which the object detection can be performed three times at most on one frame (or a structure including a detector capable of processing three frames in parallel). In FIGS. 8A to 8E, V0 and V1 each represent a vertical synchronization period corresponding to one frame, and rectangular blocks representing "person's head", "vehicle 1 (motorcycle)", "vehicle 2 (automobile)", and the like indicate that the object detection can be performed using three pieces of dictionary data (trained models) in time series within one vertical synchronization period.

FIG. 8A illustrates an example of the dictionary data switching sequence when there is no object that is already detected in one frame. The dictionary data is switched in order of the entire area of "person's head", the entire area of "vehicle 1 (motorcycle)", and the entire area of "vehicle 2 (automobile)". For example, if the dictionary data switching sequence is not available and the dictionary data that enables detection of the object selected by the user on the menu screen illustrated in FIG. 3A is constantly used, the user requires time and effort to switch the preferentially detected object setting for each scene. For example, in a case where a vehicle is captured in the image, an object to be preferentially detected is switched to the vehicle, and in other cases, the object to be preferentially detected is switched to a person. In a case where when the vehicle appears is unknown, the user may miss an image capturing timing if the user switches the preferentially detected object setting after the user has noticed the vehicle. On the other hand, in the present exemplary embodiment, "person's head" is constantly detected as a detection target that is likely to be the object in a period in which the specific object is not detected as illustrated in FIG. 8A, and with regard to other detection targets, the dictionary data is switched depending on the preferentially detected object setting. This makes it possible to reduce the number of times of switching the preferentially detected object setting.

FIG. 8B illustrates an example of the dictionary data switching sequence in the subsequent frame in a case where the motorcycle is detected in the previous frame. In this example, the dictionary data is switched in order of the entire area of "vehicle 1 (motorcycle)", the entire area of "person's head", and the local area of "vehicle 1 (motorcycle)". The dictionary data switching order is not limited to the above-described order. For example, depending on the scene, the dictionary data for the entire area of "person's head" in the example of the dictionary data switching sequence described above may be switched to dictionary data for another object that is likely to be selected as an object in addition to the motorcycle in the scene in which the image of the motorcycle is captured. The example illustrated in FIG. 8B may be considered as a sequence for setting "vehicle" as a preferentially detected object setting of the image capturing mode. In this case, control processing may be performed to prevent the object detection from being performed using dictionary data for "animal" and "bird", which are less likely to be detected in parallel with the vehicle, and dictionary data for these local areas. Consequently, the detection accuracy of the desired object is increased.

FIG. 8C illustrates an example of the dictionary data switching sequence in a case where the person's head is detected in the previous frame. The dictionary data is switched in order of the entire area of "person's head", the entire area of "vehicle 1 (motorcycle)", and "person's pupils". In this case, "person's pupils" correspond to the local area with respect to the entire area of the head of the person. While the local area of the person is being detected, by detecting the entire area of "vehicle 1 (motorcycle)" using the second dictionary data, the entire area of the vehicle can be detected when the vehicle set as the preferentially detected object enters the frame.

As illustrated in FIGS. 8A to 8E, various types of dictionary data for entire area detection are used until the object is detected using any one of the plurality of pieces of dictionary data stored in the dictionary data storage unit 204. Then, if it is highly likely that the entire area is detected, a detection ratio can be increased by reducing the number of objects to be detected and also using the dictionary data for local area detection.

FIG. 8D illustrates an example of the dictionary data switching sequence when the object detection is performed by switching among the plurality of pieces of dictionary data for entire area detection on two frames. The example in FIG. 8D is unlike the examples of FIGS. 8A to 8C in which the same dictionary data switching sequence is used for each frame. For example, if the previous detection history is not present and the object to be preferentially detected is not set, the dictionary data switching sequence for a plurality of frames is used as illustrated in the example of FIG. 8D. The dictionary data switching sequence may be switched to any one of the dictionary data switching sequences illustrated in the examples of FIGS. 8A to 8C after the entire area is detected using any one of the plurality of pieces of dictionary data.

To identify an object in a designated area when the user designates an area in the live view screen displayed on the display unit 28, the dictionary data switching sequence for a plurality of frames as illustrated in the example of FIG. 8D may be used.

FIG. 8E illustrates an example of the dictionary data switching sequence when the local area detection is set to off, and in the sequence, detection of the entire area of "vehicle 1 (motorcycle)" is performed.

When the user selects the vehicle as an object to be preferentially detected and further sets the local area detection to off, it is estimated that the object that the user desires to capture is not a driver, but a vehicle body. There is a possibility that an object similar to a detection target object may be erroneously detected as the detection target object in dictionary data generated by machine learning. Thus, the sequence is changed based on the dictionary data switching sequence illustrated in FIG. 8B in which the vehicle is selected as the object to be preferentially detected, but without performing the local area detection.

In this case, because a helmet has a shape similar to that of the head of the person, there is a possibility that the helmet may be erroneously detected as the entire area of the head of the person based on the dictionary data for entire area detection of the head of the person. As illustrated in FIG. 8E, it is possible to prevent deterioration in detection accuracy by reducing the number of types of dictionary data to be used depending on the object to be detected.

An object of the aspect of the embodiments can also be attained as follows. Specifically, a storage medium storing a program code of software in which a procedure for implementing functions according to the above-described exemplary embodiments is described is supplied to a system or an apparatus. A computer (or a central processing unit (CPU), a micro processing unit (MPU), etc.) of the system or the apparatus reads and executes the program code stored in the storage medium.

In this case, the program code read from the storage medium implements new functions of the exemplary embodiments of the disclosure, and the storage medium storing the program code and program are included in the disclosure.

Examples of the storage medium for supplying the program code include a flexible disk, a hard disk, an optical disk, and a magneto-optical disk. A compact disc (CD)-ROM, a CD-Recordable (R), CD-ReWritable (RW), a Digital Versatile Disk (DVD)-ROM, a DVD-RAM, a DVD-RW, a DVD-R, a magnetic tape, a nonvolatile memory card, a ROM, and the like can also be used.

The functions according to the above-described exemplary embodiments are implemented by executing the program code read by the computer. Further, based on instructions from the program code, some or all of the actual processes may be performed by an operating system (OS) or the like running on the computer, and the functions according to the above-described exemplary embodiments may be implemented by the processes.

The aspect of the embodiments also includes the following case. First, the program code read from the storage medium is written into a memory included in a function expansion board inserted into the computer, or into a function expansion unit connected to the computer. Then, based on instructions from the program code, some or all of the actual processes are performed by a CPU or the like included in the function expansion board or the function expansion unit.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-030470, filed Feb. 26, 2021, which is hereby incorporated by reference herein in its entirety.

What is claimed is:

1. An apparatus, comprising:
    at least one processor and a memory coupled to the at least one processor storing instructions that, when executed by the processor, cause the processor to function as:
    an acquisition unit configured to acquire captured data;
    a first detection unit configured to detect a first area of an object from the data;
    a second detection unit configured to detect a second area of the object from the data; and
    an output unit configured to output a result of detection by the first detection unit and a result of detection by the second detection unit,
    wherein, in a case where the first detection unit detects the first area in first data acquired by the acquisition unit, the second detection unit utilizes an area for detection of the second area that corresponds to the first area in the first data and is trimmed on a basis of a position and a size of the first area detected in the first data, and
    wherein, in a case where the first area is detected in the first data and the first area is not detected in second data acquired by the acquisition unit after acquisition of the first data, the second detection unit utilizes an area for detection of the second area, in the second data, that corresponds to the first area detected in the first data and is trimmed on a basis of the position and the size of the first area detected in the first data.

2. The apparatus according to claim 1, wherein the first detection unit and the second detection unit use a first model and a second model, the first model and the second model being preliminarily trained by machine learning.

3. The apparatus according to claim 2, wherein the second model is a model having been trained using an image in which an object to be detected as the first area is a background as an input image, and using positional information of the second area in the input image as an annotation.

4. The apparatus according to claim 3, wherein the first model is a model having been trained using an image including an object to be detected as the first area and a background as an input image, and using positional information of the first area in the input image as an annotation.

5. The apparatus according to claim 1, wherein the first area is wider than the second area.

6. The apparatus according to claim 1, further comprising:
    third and fourth detection units each configured to detect at least a partial area of an object different from the object detected by the first detection unit and the second detection unit;
    a setting unit configured to set a capturing mode; and
    a control unit configured to switch the first to fourth detection units depending on the set capturing mode.

7. The apparatus according to claim 6, wherein the first area and the second area are each an area corresponding to at least part of a vehicle, and the second area is narrower than the first area.

8. The apparatus according to claim 7,
    wherein the third detection unit detects a third area corresponding to at least part of a person, and the fourth detection unit detects a fourth area corresponding to at least part of an animal different from the person, and
    wherein the control unit does not cause the fourth detection unit to perform detection processing on data acquired by the acquisition unit on which the first detection unit performs detection processing.

9. The apparatus according to claim 1, wherein, in a case where the first area is not detected by the first detection unit and the second area is detected by the second detection unit in the first data, the second detection unit detects the second area in an area based on a position and a size of the second area detected in the first data in the second data.

10. The apparatus according to claim 1, wherein, in a case where at least one of the first area and the second area is detected in the first data and the first area does not fit within second data, the second detection unit detects the second area from the second data without performing trimming.

11. The apparatus according to claim 1, wherein, in a case where the second area is detected in the first data, and the first area is detected as a detection result in the second data, the second detection unit detects the second area from an area obtained by trimming the second data based on a relationship between a size of the first area and a size of the second area in the first data.

12. The apparatus according to claim 1, wherein the second detection unit detects the second area by calculating a movement amount of each of the first area and the second area based on the first data in which one of the first area and the second area is detected, and generating data by trimming the acquired data to an area in which one of the first area and the second area is estimated to be present in the second data.

13. The apparatus according to claim 1, wherein the second detection unit compares a plurality of pieces of data including the first data in which one of the first area and the second area has been detected, and in a case where it is determined that a size of one of the first area and the second area increases with a lapse of time, the second detection unit detects the second area in the second data.

14. The apparatus according to claim 1, wherein the second detection unit detects the second area by comparing a plurality of pieces of data in a previous frame including the first data in which the first area and the second area are detected, estimating a relationship between a size of the first area and a size of the second area in a current image based on transition of the size of the first area and the size of the second area, and trimming the acquired data to satisfy a relationship between a size of the first area and a size of the second area in the previous frame in the second data.

15. The apparatus according to claim 1, wherein, even in a case where the first area is not detected in the second data and the first area is detected in the first data, if a difference between the first data and the second data is more than or equal to a certain threshold, the second detection unit does not detect the second area.

16. An image apparatus, comprising:
    at least one processor and memory coupled to the at least one processor storing instructions that, when executed by the processor, cause the processor to function as:
    a sensor configured to capture an object image being formed through a lens unit; and
    the apparatus according to claim 1.

17. A method for an apparatus, comprising:
    acquiring captured data;
    detecting, as a first detection, a first area of an object from the captured data;
    detecting, as a second detection, a second area of the object from the captured data; and
    outputting a result of the first detection and a result of the second detection,
    wherein, in a case where the first area is detected in first data in the first detection, the second area is detected utilizing an area for detection of the second area that corresponds to the first area in the first data in the second detection and is trimmed on a basis of a position and a size of the first area detected in the first data, and
    wherein, in a case where the first area is detected in the first data and the first area is not detected in second data captured after the first data, the second area is detected utilizing an area for detection of the second area that corresponds to the first area detected in the first data in the second detection in the second data and is trimmed on a basis of the position and the size of the first area detected in the first data.

18. A non-transitory computer-readable storage medium storing a program for causing a computer to execute a control method, the method comprising:
    acquiring captured data;
    detecting, as a first detection, a first area of an object from the captured data;
    detecting, as a second detection, a second area of the object from the captured data; and
    outputting a result of the first detection and a result of the second detection,
    wherein, in a case where the first area is detected in first data in the first detection, the second area is detected utilizing an area for detection of the second area that corresponds to the first area in the first data in the second detection and is trimmed on a basis of a position and a size of the first area detected in the first data, and
    wherein, in a case where the first area is detected in the first data and the first area is not detected in second data captured after the first data, the second area is detected utilizing an area for detection of the second area that corresponds to the first area detected in the first data in the second detection in the second data and is trimmed on a basis of the position and the size of the first area detected in the first data.

* * * * *